United States Patent
Dziekonski et al.

(10) Patent No.: US 11,805,173 B2
(45) Date of Patent: Oct. 31, 2023

(54) WIRELESS NETWORK FOR HORTICULTURAL SYSTEMS

(71) Applicant: Fluence Bioengineering, Inc., Austin, TX (US)

(72) Inventors: Cristin Dziekonski, Norwalk, CT (US); Gregory Hovagim, Austin, TX (US)

(73) Assignee: FLUENCE BIOENGINEERING, INC., Austin, TX (US)

( * ) Notice: Subject to any disclaimer, the term of this patent is extended or adjusted under 35 U.S.C. 154(b) by 206 days.

(21) Appl. No.: 17/308,088

(22) Filed: May 5, 2021

(65) Prior Publication Data

US 2022/0360629 A1    Nov. 10, 2022

(51) Int. Cl.
  *H04L 69/08* (2022.01)
  *H04W 92/02* (2009.01)
  *H04L 67/12* (2022.01)

(52) U.S. Cl.
  CPC .............. *H04L 67/12* (2013.01); *H04L 69/08* (2013.01); *H04W 92/02* (2013.01)

(58) Field of Classification Search
  None
  See application file for complete search history.

(56) References Cited

U.S. PATENT DOCUMENTS

| | | | |
|---|---|---|---|
| 9,888,081 B1* | 2/2018 | Farinelli, Jr. | H04L 67/12 |
| 10,917,956 B1 | 2/2021 | King et al. | |
| 2015/0163888 A1 | 6/2015 | Fredricks | |
| 2018/0014374 A1* | 1/2018 | Rhodes | H05B 47/19 |
| 2018/0084733 A1* | 3/2018 | Adams | H05B 47/11 |
| 2019/0191517 A1* | 6/2019 | Adams | H05B 45/20 |
| 2019/0297798 A1* | 10/2019 | Levine | G06F 9/542 |

FOREIGN PATENT DOCUMENTS

| | | | |
|---|---|---|---|
| WO | 2001022690 A1 | 3/2001 | |
| WO | WO-2020167934 A1 * | 8/2020 | A01B 79/005 |

* cited by examiner

*Primary Examiner* — Ajit Patel

(57) ABSTRACT

Systems and methods disclosed herein include a wireless horticultural system, which includes a computer, an adapter configured to receive an input from the computer, in which the input is formatted in a first native communications protocol of the computer, convert the input from the first native communications protocol into a first wireless signal, and transmit the first wireless signal to one or more controllers. The system further includes the one or more controllers, in which a first controller in the one or more controllers is connected to the adapter and configured to receive the first wireless signal from the adapter, and provide the input encoded in the first wireless signal to a device connected to the first controller.

24 Claims, 13 Drawing Sheets

WIRELESS NETWORK FOR HORTICULTURAL SYSTEMS

FIELD OF THE DISCLOSURE

This disclosure relates to horticultural systems, and specifically to systems and methods of providing wireless network connectivity to various components in a horticultural system.

BACKGROUND

Indoor farming environments, such as vertical farms and greenhouses, utilize various devices and equipment to aid crop growth. One of the major components in an indoor farming environment is lighting. Control of horticultural lighting is important to growers because light has a high impact on plant growth, but also consumes a lot of power and therefore represents a large expenditure. In addition, there are other devices in indoor farming environments that growers may want to control, such as temperature and HVAC systems, sensors, irrigation systems, and the like. It is also beneficial for growers to receive data from all these devices so they can be updated with the current status of the horticultural system.

One example in which control of horticultural lighting is beneficial is for dimming of the lights. Manual on/off switching or dimming of horticultural lights may be cumbersome, especially if a grower wants to implement advanced lighting regimes, such as photoperiod and photoacclimation control. It would be much easier if a grower could remotely control lights or automate lighting control in order to implement various light schedules. Furthermore, remote control and automated scheduling of other devices in the horticultural system allows growers even more control over indoor farming environments.

Connecting the various devices in a horticultural system together with a central controller is challenging in an indoor farming environment due to the number of devices that may need to be connected and how spread out the devices are in the environment. The devices may be connected together using a wired network, but such a system is very expensive to install, especially in large facilities. It is also difficult and time consuming to alter wired networks in case devices are added or removed, or if the layout of the facility changes. In addition, wired networks may not be able to support all the functions a wireless network could provide. Wireless networks also have their challenges. For example, standards-based wireless solutions like Wi-Fi and Bluetooth may be used to support a wireless network, but they have difficulty scaling to large number of devices. Indoor farming environments can include hundreds or thousands of devices that may be connected to the network. Proprietary wireless networks may be developed, but are expensive to develop and maintain. Thus what is needed is a cost-effective, flexible solution for connecting many devices in a horticultural system.

SUMMARY

Systems and methods disclosed herein include a wireless horticultural system, which includes a computer, an adapter configured to receive an input from the computer, in which the input is formatted in a first native communications protocol of the computer, convert the input from the first native communications protocol into a first wireless signal, and transmit the first wireless signal to one or more controllers. The system further includes the one or more controllers, in which a first controller in the one or more controllers is connected to the adapter and configured to receive the first wireless signal from the adapter, and provide the input encoded in the first wireless signal to a device connected to the first controller.

In some implementations, the controller is configured to provide the input encoded in the first wireless signal to the device by converting the first wireless signal into a second native communications protocol of the device and providing the converted first wireless signal to the device. In some implementations, the first native communications protocol and the second native communications protocol are the same.

In some implementations, the first controller is further configured to receive data from the device and transmit the data encoded in a second wireless signal to at least one of the adapter or one or more other controllers. In some implementations, the data is formatted in a second native communications protocol and the first controller is further configured to convert the data into the second wireless signal. In some implementations, the first native communications protocol and the second native communications protocol are the same. In some implementations, the first controller transmits the second wireless signal to the adapter and the adapter is further configured to receive the second wireless signal, convert the second wireless signal into the first native communications protocol, and transmit the converted second wireless signal to the computer. In some implementations, the data includes at least one of sensor data, operational data of the device, and status data of the device. In some implementations, the first wireless signal and the second wireless signal use a same wireless protocol. In some implementations, the first controller is further configured to buffer the received data from the device. In some implementations, the first controller is further configured to perform data processing on the buffered data and transmit the processed data to at least one of the adapter and the one or more controllers.

In some implementations, the first communications protocol is one of a 0-10V, PWM, or DALI control interface. In some implementations, the first wireless signal is a Bluetooth Mesh signal. In some implementations, the input comprises a command to control the device. In some implementations, the device comprises a luminaire. In some implementations, the input comprises a command to change a light intensity of the luminaire. In some implementations, the luminaire illuminates one or more plants. In some implementations, at least one of the adapter is further configured to relay wireless signals from the first controller to a second controller or a second adapter in the wireless horticultural system, and the first controller is further configured to relay wireless signals from at least one of the adapter or the second controller to a third controller or the second adapter. In some implementations, the adapter is further configured to act as an interface with a device that is remote from the wireless horticultural system. In some implementations, at least one of the adapter is further configured to store schedules for controlling devices connected to the one or more controllers, and the first controller is further configured to store schedules for controlling the device connected to the first controller. In some implementations, at least one of the adapter further includes a first onboard clock and is further configured to generate wireless signals including control commands at scheduled times based on the stored schedules and the first onboard clock, and the first controller further includes a second onboard clock and is further configured to generate inputs including control commands to provide to the device at scheduled times based on the stored schedules and the second onboard clock.

In some implementations, the adapter is further configured to buffer data for devices or sensors connected to the one or more controllers. In some implementations, the adapter is further configured to perform data processing on the buffered data and transmit the processed data to the computer. In some implementations, at least one of the adapter and the first controller is further configured to convert a third native communications protocol of an external device into a wireless protocol used by the wireless horticultural system. In some implementations, the first controller is further configured to act as a beacon for providing location services. In some implementations, the first controller is further configured to provide power to auxiliary components connected to the first controller.

Further implementations disclosed herein include a method of operating a wireless horticultural system. The method includes receiving, at an adapter, an input from a computer, in which the input is formatted in a first native communications protocol of the computer, converting, by the adapter, the input from the first native communications protocol into a first wireless signal, transmitting, by the adapter, the first wireless signal to one or more controllers, receiving, at a first controller in the one or more controllers, the first wireless signal from the adapter, and providing, by the first controller, the input encoded in the first wireless signal to a device connected to the first controller.

In some implementations, providing the input encoded in the first wireless signal to the device includes converting the first wireless signal into a second native communications protocol of the device, and providing the converted first wireless signal to the device. In some implementations, the method further includes receiving, at the first controller, data from the device, and transmitting the data encoded in a second wireless signal to at least one of the adapter or one or more other controllers. In some implementations, the data is formatted in a second native communications protocol and the method further includes converting, by the first controller, the data into the second wireless signal. In some implementations, the method further includes transmitting, by the first controller, the second wireless signal to the adapter, receiving, at the adapter, the second wireless signal, converting, by the adapter, the second wireless signal into the first native communications protocol, and transmitting the converted second wireless signal to the computer.

These and other features of the present implementations will be understood better by reading the following detailed description, taken together with the figures herein described. The accompanying drawings are not intended to be drawn to scale. For purposes of clarity, not every component may be labeled in every drawing.

DETAILED DESCRIPTION

Figure 1:
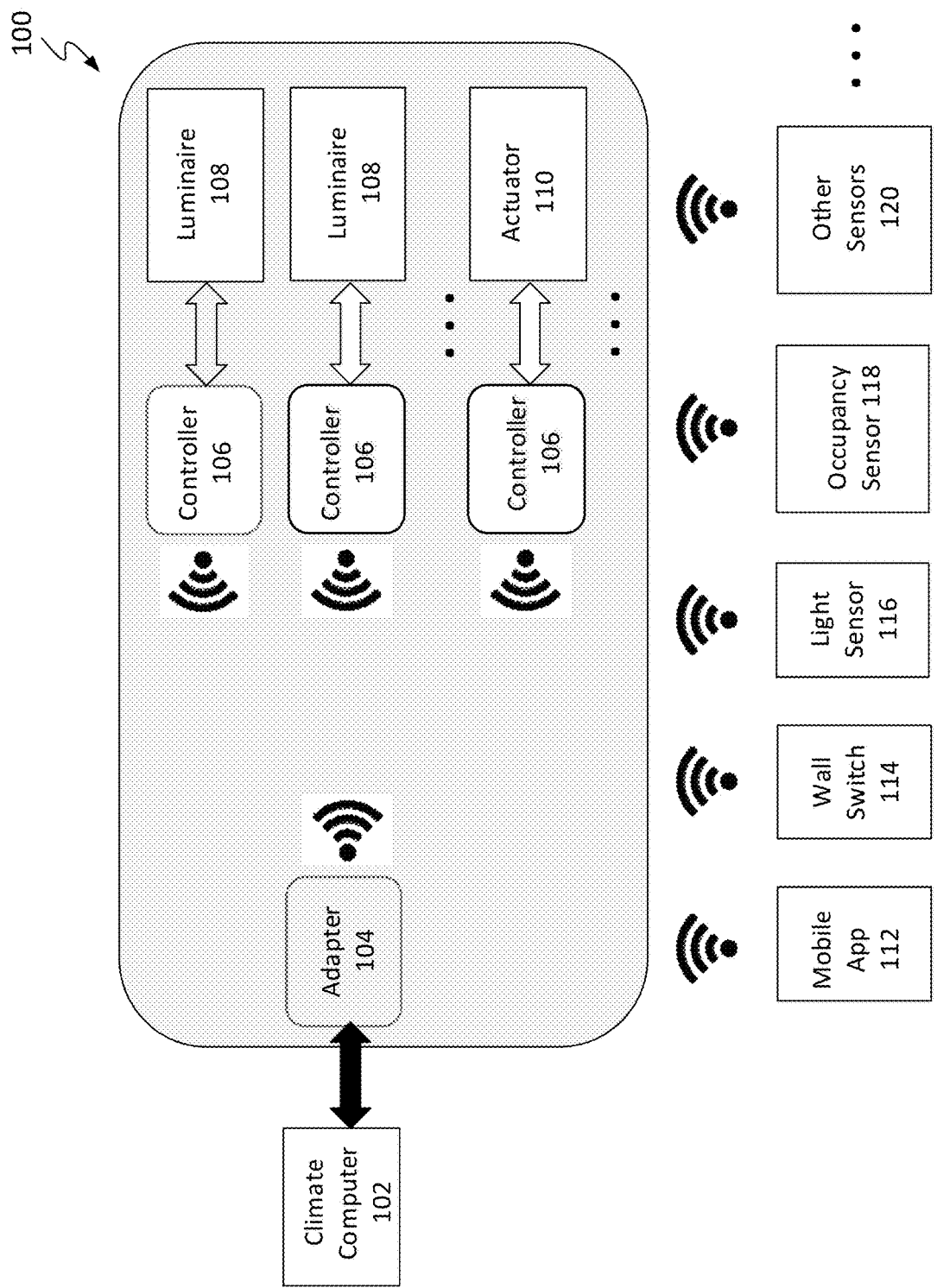
FIG. 1 is a block diagram illustrating a wireless horticultural system in accordance with various implementations.

FIG. 1 is a block diagram illustrating a wireless horticultural system 100 in accordance with various implementations. The wireless horticultural system 100 includes a climate computer 102 communicatively coupled to one or more adapters 104. The climate computer 102 may be located proximate, remotely, or partially proximate and partially remotely to the rest of the wireless horticultural system 100. The climate computer 102 may include one or more controllers, computers, or servers that implement general monitoring, control, and data analysis functions for the wireless horticultural system 100. These functions may include, but are not limited to, monitoring the current status of lights, sensors, and other components in the wireless horticultural system 100, controlling the lights (e.g., dimming), actuators, sensors, and other components in the wireless horticultural system 100, implementing scheduled control of components in the wireless horticultural system 100 (e.g., dimming schedules), data analysis of data received from components in the wireless horticultural system 100 (e.g., machine learning), and input/output functions for users to view information, control components in the wireless horticultural system 100, and set and change schedules. For example, the climate computer 102 may be a power supply with user inputs that allows manual or automated control of power settings. In another example, the climate computer may be a power supply communicatively coupled to a remote server that controls the power supply.

Adapter 104 may communicate directly with the climate computer 102 and may be configured to utilize the native communication protocol of the climate computer 102. The adapter 105 may be configured to convert its messages to/from a wireless signal, allowing for backwards compatibility with existing climate computers 102. For example, the climate computer 102 may transmit lighting commands using a 0-10V luminaire control interface. The adapter 104 may be configured to receive the 0-10V signal and convert it into a wireless signal.

The adapter 104 may be configured to communicate wirelessly with a plurality of controllers 106, and transmit commands received from the climate computer 102 to the controllers 106. The adapter 104 may support all of the functionality required to implement the wireless protocol utilized in the wireless horticultural system 100. For example, the adapter 104 may transmit commands to the controllers 106 via Bluetooth Mesh, Bluetooth Low Energy, Zigbee, Thread, or Wi-Fi. The adapter 104 may also be configured to receive data from the controllers 106. The adapter 104 may also communicate wirelessly with a number of other devices in the wireless horticultural system, such as mobile application 112, wall switch 14, light sensor 116, occupancy sensor 118, and other sensors 120.

There can be one to many adapters 200 in the wireless horticultural system 100. Each one may control/monitor a different group of controllers 106 and other devices in the network, or multiple adapters 200 may be configured to control/monitor the same network group for redundancy. The details of the adapter 104 are further described with reference to FIG. 2.

The controllers 106 are configured to wirelessly receive commands and other information from the adapter 104 and convert it back to the native communications protocol of devices connected to the controllers 106 (e.g., a 0-10V, PWM, or DALI control signal). The controllers 106 may then pass the control signal to the devices connected to the controllers 106, such as luminaires 108 or actuators 110. The actuators 110 may control other equipment present in an indoor farming environment, such as irrigation equipment, fertigation equipment, air handlers, fans, HVAC equipment, or other building management systems. The luminaires 108 and actuators 110 may not be configured for wireless communication, and therefore the controllers 106 enable wireless functionality for devices that normally don't have wireless functionality. In addition, the controllers 106 convert device-specific control protocols into a standard wireless protocol and vice versa, enabling easy incorporation of controlled devices into the wireless horticultural system 100.

The controllers 106 may be configured to convert the wireless signal to a native communications protocol to the device to which it is connected, in order to provide a backwards-compatible solution. If the device connected to the controller 106 supports a two-way control protocol, it may send its current status, diagnostic information, sensor data, etc. back to the controller 106. The controller 106 may then convert the information into a wireless signal that is transmitted to the adapter 104 or other devices in the wireless horticultural system 100. The controllers 106 may support all of the functionality to implement the wireless protocol utilized by the adapter 104. The details of the connectors 106 are further described with reference to FIG. 3. In some implementations, the luminaires 108 and actuators 110 may be wireless enabled and the controllers 106 are integrated within the devices. In such cases, the controllers 106 may not need to convert the wireless signals to the native communications protocol of the luminaires 108 and actuators 110 and vice versa because the devices may natively support the wireless communications protocol.

The luminaires 108 may be configured to irradiate plants in the indoor farming environment. For example, the indoor farming environment may include a plurality of plant beds in which crops are being grown. The luminaires 108 are installed proximate to the plant beds and irradiate the plants. In large scale indoor farming environments, there may be hundreds or thousands of plant beds, and therefore hundreds or thousands of luminaires 108. The luminaires 108 may be configured to emit a specific wavelength spectrum, which may be beneficial for specific types of plants. In some implementations, the luminaires 108 may emit a fixed spectrum, while in other implementations the luminaires 108 may emit a variable spectrum.

The luminaires 108 may be configured to receive control signals via a native communications protocol, but may not be configured for wireless communication. For example, the luminaires 108 may include a 0-10V control interface and the controllers 106 may be connected to the 0-10V control interface of each luminaire 108. The controllers 106 may receive wireless signals from the adapter 104 and convert the wireless signal into a 0-10V signal to be passed to the luminaires 108. In some implementations, the luminaires 108 may be configured to transmit information as well. For example, the luminaires 108 may be configured to transmit sensor data from an integrated sensor, or status or operational data via the standard control protocol. The controllers 106 may be configured to convert the data from the native communications protocol (e.g., 0-10V, PWM, or DALI signal) into a wireless signal for transmission to the adapter 104.

Similarly, actuators 110 may be configured to receive control signals via a native communications protocol, but may not be configured for wireless communication. For example, the actuators may include a 0-10V control interface and the controllers 106 may be connected to the 0-10V control interface of each actuator 110. The controllers 106 may receive wireless signals from the adapter 104 and convert the wireless signal into a 0-10V signal to be passed to the actuators 110. In some implementations, the actuators 110 may be configured to transmit information as well. For example, the actuators 110 may be configured to transmit sensor data, or status or operational data via the native communications protocol. The controllers 106 may be configured to convert the data from the native communications protocol (e.g., 0-10V, PWM, or DALI signal) into a wireless signal for transmission to the adapter 104.

The wireless horticultural system 100 may also include a mobile application 112 executing on a device carried by a user (e.g., tablet, smart phone, laptop, desktop). The mobile application 112 may provide a local interface to allow users to interact with the network. The mobile application 112 may allow the user to carry out a number of functions, such as commissioning of devices within the wireless horticultural system 100, administration and troubleshooting of the wireless horticultural system 100, locally controlling devices (e.g., luminaires 108 and actuators 110) in the wireless horticultural system 100, or locally viewing sensor and other operational data from the wireless horticultural system 10. The device executing the mobile application 112 may either natively support the wireless communication protocol of the network or relies on one of the other devices in the network, e.g. the adapter 104 or the controllers 106, to act as a bridge. The device executing the mobile application 112 may be a permanent fixture within the wireless horticultural system 100, or may be mobile as it is carried by different users.

The wireless horticultural system 100 may also include a wall switch 114. The wall switch 114 may be permanently installed at the facility, accessible to all or a subset of users. The wall switch 114 may be configured to act as a local interface to allow users to control the luminaires 108 and/or actuators 110. The wall switch 114 may communicate wirelessly with the luminaires 108 and actuators via the adapter 104 and controllers 106.

The wireless horticultural system 100 may also include one or more light sensors 116. The light sensors 116 provide the current light levels to the wireless horticultural system 100, allowing a control algorithm (for example, executing on the client computer 102) to use them as inputs for monitoring, control, and data analysis. An example use case is to adjust the light level of the luminaires 108 on a real-time basis as the ambient light levels in the indoor farming environment change. The light sensor 116 may be configured to receive changes to its configuration settings, so that it can be configured remotely with a specific light control setting. The light sensor 116 may then be used to autonomously maintain certain light levels depending on the current position in the horticulture growing cycle of a plant. This light control setting may change over time, for example following a photoacclimation or photoperiod lighting schedule. The light sensor 116 may be a standard daylight harvesting sensor (reporting light levels in Lux) or one optimized specifically for a horticulture environment (reporting light levels in PAR).

The wireless horticultural system 100 may also include one or more occupancy sensors 118. The occupancy sensors 118 may be configured to report the current location of users within the indoor farming environment, allowing a control algorithm (for example, executing on the client computer 102) to use them as inputs for monitoring, control, and data analysis. One example use case is to disable supplemental $CO_2$ when there are employees working in a growing area.

The wireless horticultural system 100 may also include one or more other sensors 120. The other sensors 120 may enable further functionality within the wireless horticultural system 100, such as providing additional inputs to the control system or simply using the network as a low-cost backhaul. The wireless horticultural system 100 may also include other components and devices not illustrated in FIG. 1.

Figure 2:
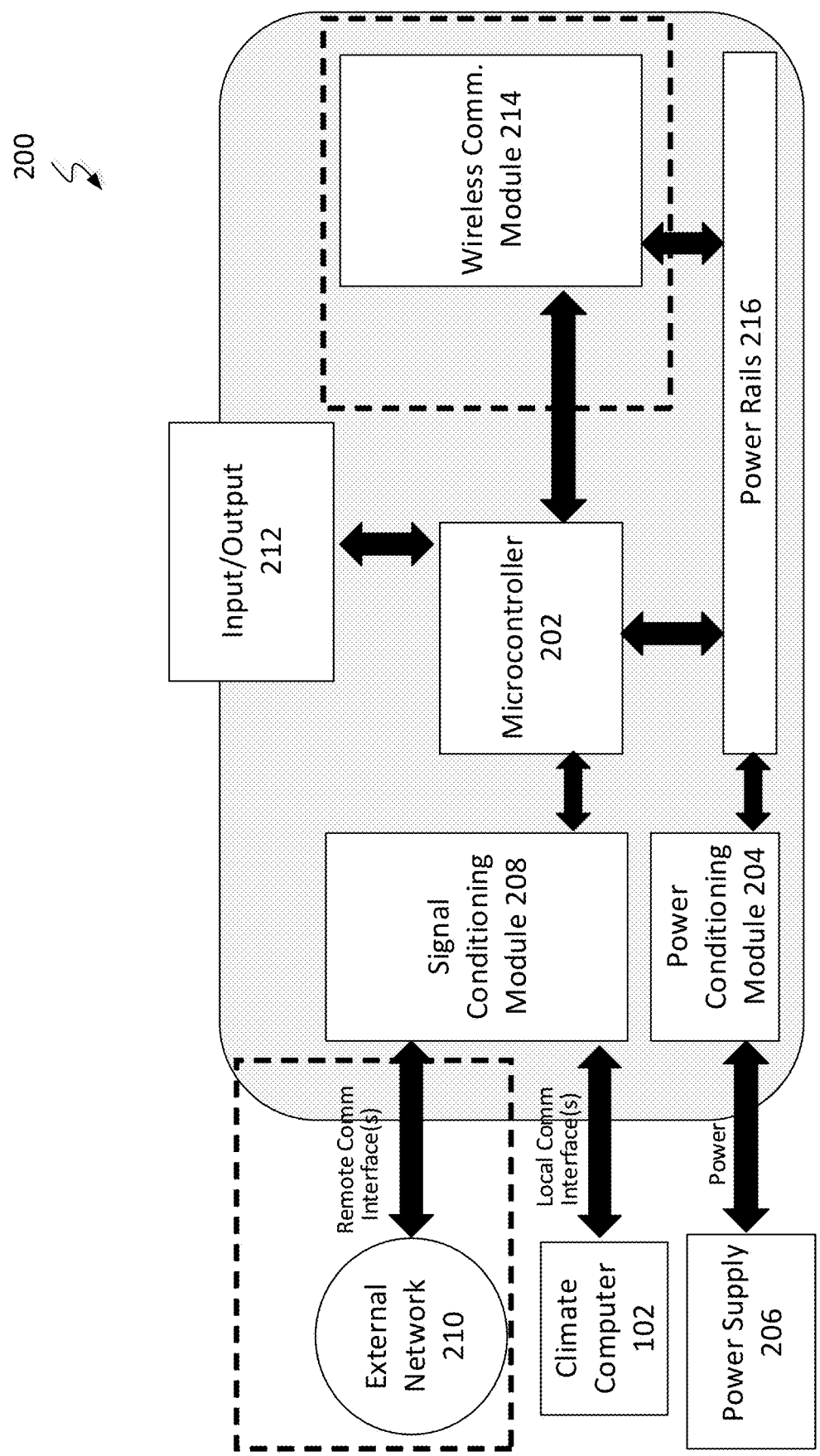
FIG. 2 is a block diagram of an adapter for use in a wireless horticultural system in accordance with various implementations.

FIG. 2 is a block diagram of an adapter 200 for use in a wireless horticultural system in accordance with various implementations. The adapter 200 may include a microcontroller 202 that executes the embedded software stored in memory (not illustrated) of the adapter 200. In some implementations, the microcontroller 202 may be configured for wireless communication, for example by Wi-Fi, Zigbee, Thread, Bluetooth Mesh, or Bluetooth Low Energy. In some implementations, the microcontroller 202 may not be configured for wireless communication, so the adapter 200 may include an optional wireless communication module 214. The adapter 200 may draw power from a power supply 206 (e.g., battery) via a power conditioning module 204. The power is supplied to all the components in the adapter 200 via power rails 216. The adapter 200 may communicate with the climate computer 102 over a local communication interface (e.g., 0-10V, PWM, or DALI wired control interface) via a signal conditioning module 208. The signal conditioning module 208 may also enable the adapter 200 to communicate with external networks 210 (e.g., the Internet) using a remote communications interface (e.g., Ethernet port). The adapter 200 may also include input/output module 212, which may include LED indicator lights, display screen, buttons, other user interface components, and sensors (e.g., Hall Effect sensor).

The adapter 200 may be configured to receive instructions from the climate computer 102 via the local communication interface. The instructions may be formatted in the native communications protocol of the climate computer 102 (e.g., 0-10V, PWM, or DALI control signal). The adapter 200 is configured to convert the received instructions into a wireless signal that is transmitted by the microcontroller 202 (if enabled for wireless communication) or by the separate wireless communication module 214 to one or more controllers or other devices. The adapter 200 may be configured to autonomously convert and transmit wireless signals. For example, the adapter 200 may be configured to send an updated control message whenever the input from the climate computer 102 changes by more than 1%, when it is initially powered on, and/or at periodic intervals (e.g. every 30 minutes) to ensure that the horticultural system doesn't fall out of sync.

The adapter 200 may also wirelessly receive data from the controllers or other devices, and is configured to convert the received wireless signals into the native communications protocol of the climate computer 102 (e.g., 0-10V, PWM, or DALI control signal). The adapter 200 may then transmit the data to the climate computer 102. In this way, the adapter 200 facilitates communication between a climate computer 102 having a specific non-wireless communications interface and a standards-based wireless network.

The adapter 200 may have other optional functionality. For example, the adapter 200 may be configured to act as a repeater within the wireless network, relaying network traffic between any two nodes in the wireless network which otherwise wouldn't be within radio range of each other (assuming the wireless protocol supports it). In some implementations, the adapter 200 may be configured to act as a gateway and handle the network management responsibilities of the wireless network, if the selected wireless protocol selected allows it. In some implementations, the adapter 200 may support a remote interface, allowing the wireless network to be administered, controlled, monitored (including sensor data & luminaire diagnostic data), etc. remotely, in addition to interfacing locally with the climate computer 102. As part of this use case, other horticulture devices (unrelated to the control system) could utilize the network as a low-cost backhaul and retrieve their data locally or remotely.

In some implementations, the adapter 200 may act as a buffer, either storing monitoring sensor and/or control messages locally in case the local/remote interface becomes disconnected. In some implementations, the adapter 200 may act as a scheduler if it includes a clock, so that the adapter 200 may send out updated control messages at the correct times in the future. In some implementations, the adapter 200 may act as a network interface bridge, allowing otherwise incompatible devices to participate in the wireless network. Some examples may include providing an interface to a mobile phone which doesn't natively speak the protocol of the wireless network, or providing an interface to a wireless switch which is designed for low-power (e.g., battery-less) operation and doesn't fully support the wireless network protocol for power efficiency reasons. In some implementations, the adapter 200 may support edge computing, running the monitoring and/or network data through a machine learning algorithm to derive insights from the data locally, so that just the insights can be transmitted to either the climate computer 102 or the remote interface rather than all of the raw data. Additional information about optional functionalities of the adapter 200 are found in relation to FIGS. 7-10.

Figure 3:
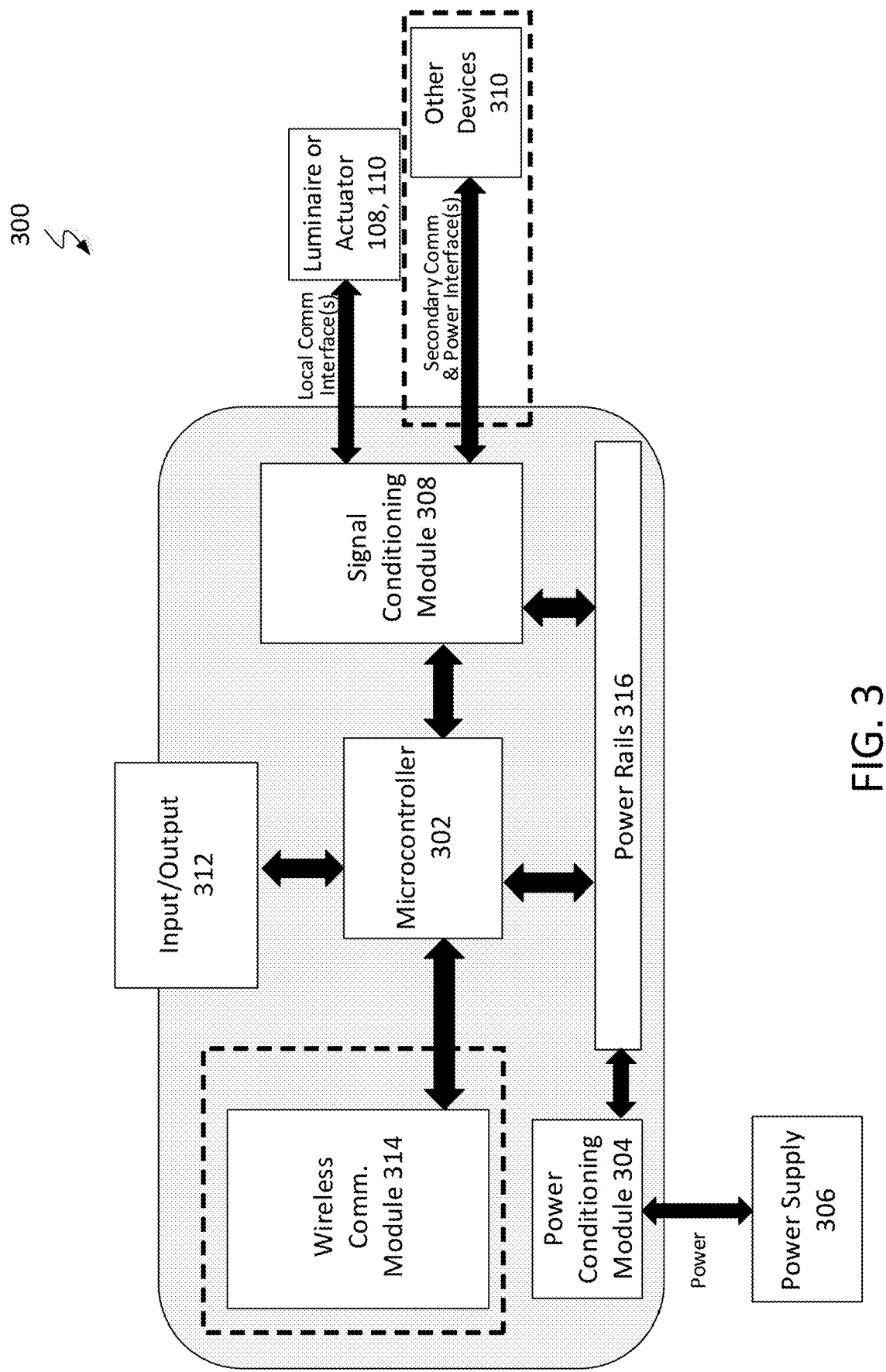
FIG. 3 is a block diagram of a controller for use in a wireless horticultural system in accordance with various implementations.

FIG. 3 is a block diagram of a controller 300 for use in a wireless horticultural system in accordance with various implementations. The controller 300 may include a microcontroller 302 that executes the embedded software stored in memory (not illustrated) of the controller 300. In some implementations, the microcontroller 302 may be configured for wireless communication, for example by Wi-Fi, Zigbee, Thread, Bluetooth Mesh, or Bluetooth Low Energy. In some implementations, the microcontroller 302 may not be configured for wireless communication, so the adapter may include an optional wireless communication module 314. The controller 300 may draw power from a power supply 306 (e.g., battery) via a power conditioning module 304. The power is supplied to all the components in the controller 300 via power rails 316. The controller 300 may communicate with a luminaire 108 or actuator 110 connected to the controller 300 over a local communication interface (e.g., 0-10V, PWM, or DALI wired control interface) via a signal conditioning module 308. The signal conditioning module 308 may also enable the controller 300 to communicate with other devices 310 using a secondary communications interface. The controller 300 may also include input/output module 312, which may include LED indicator lights, display screen, buttons, other user interface components, and sensors (e.g., Hall Effect sensor).

The controller 300 may be configured to receive instructions from an adapter (e.g., adapter 200) via a wireless network. The wireless signals may be received by the microcontroller 302 (if enabled for wireless communication) or by the separate wireless communication module 314. The controller 300 may be configured to convert the received wireless signal into the native communications protocol (e.g., 0-10V, PWM, or DALI control signal) of the luminaires 108 or actuator 110 connected to the controller 300. The controller 300 may also receive data (e.g., sensor data, operational or status information) from the connected luminaire 108 or actuator 110 in the native communications protocol, and is configured to convert the data into a wireless signal. The controller 300 may then transmit the data to the adapter 200 or other devices in the wireless network. The controller 300 may be associated with and be controlled by one or more adapters 200.

In this way, the controller 300 facilitates communication between devices (e.g., luminaires, actuators) having a specific non-wireless communications interface and a standards-based wireless network. This enables easy incorporation of end-point devices, especially non-wirelessly enabled devices, into the network. For example, new luminaires or actuators may be added to the network by simply connecting controllers 300 to each of them and commissioning them. Devices may be removed from the system simply by disconnecting the controllers 300. Devices and controllers 300 may also be moved around the facility easily as there is no wiring to connect them to the network—they just need to be recommissioned once located in a new location. This flexibility is important in an indoor farming environment because devices are frequently added, removed, or moved. Also, a standards-based wireless network is much cheaper to implement than wired proprietary wireless solutions.

The controller 300 may have other optional functionality. For example, the controller 300 may act as a repeater within the wireless mesh, relaying network traffic between any two nodes in the wireless network which otherwise wouldn't be within radio range of each other (assuming the wireless protocol supports it). In some implementations, the controller 300 may store a lighting schedule locally, allowing a luminaire's control schedule to continue to execute if the rest of the network goes down. In some implementations, the controller 300 may help with administration of the wireless network.

In some implementations, the controller 300 may act as a network interface bridge, allowing otherwise incompatible devices to participate in the wireless network. Some examples could may include providing an interface to a mobile phone which doesn't natively speak the protocol of the wireless network, or providing an interface to a wireless switch which is designed for low-power (e.g., battery-less) operation and doesn't fully support the wireless network protocol for power efficiency reasons. In some implementations, the controller 300 may act as location beacons, allowing the wireless network to be used for cost-effective location services. Some examples may include coarse- or fine-grained asset tracking or tracking the movement of users within the indoor farming environment for labor optimization studies, employee safety, or security use cases. In some implementations, the controller 300 may provide power (and optionally a communication interface) for sensors, cameras, and other devices that are placed within the indoor farming environment. Additional information about optional functionalities of the controller 300 are found in relation to FIGS. 7 and 10-13.

Figure 4:
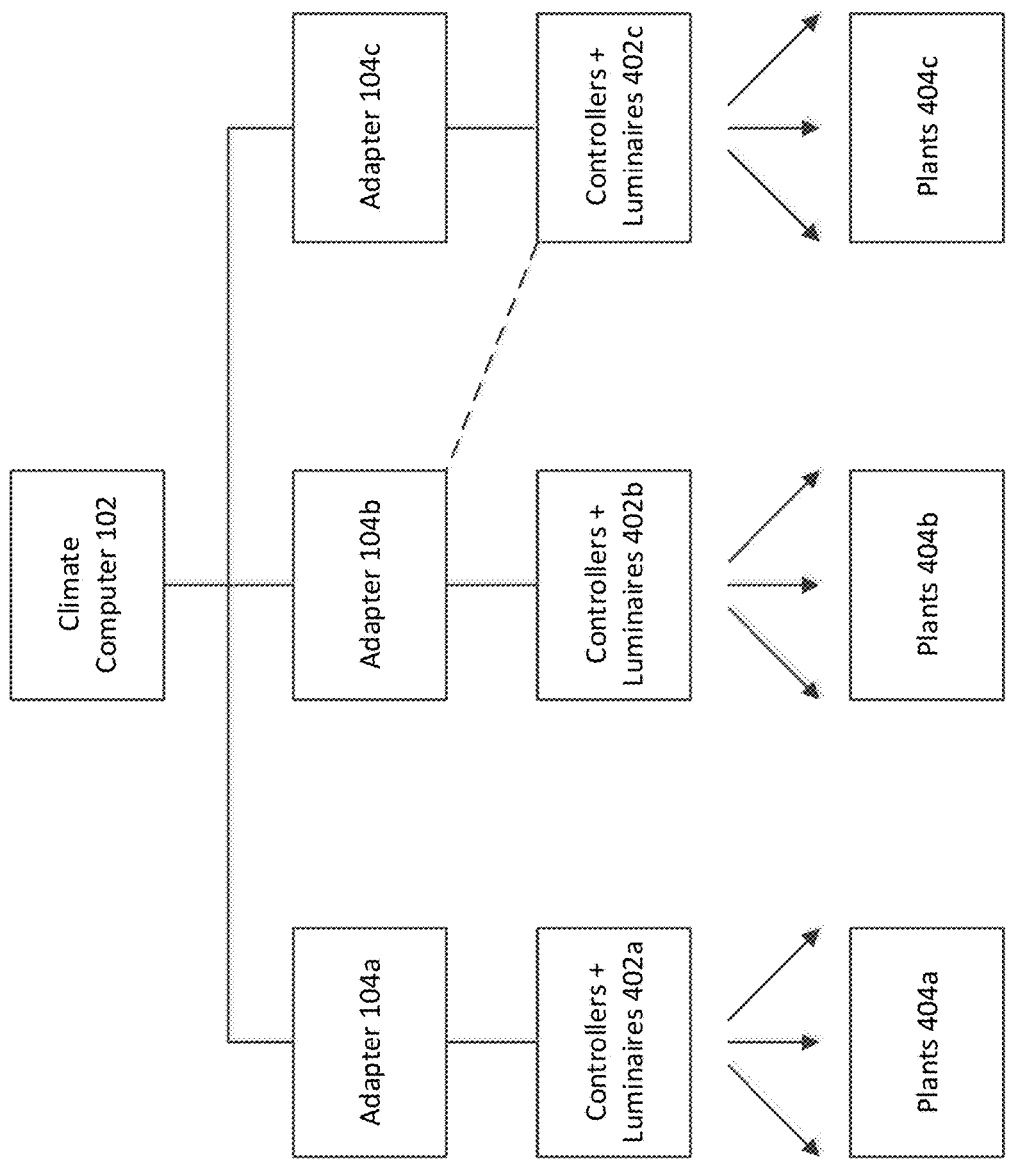
FIG. 4 is an example layout of a wireless horticultural system in accordance with various implementations.

FIG. 4 is an example layout of a wireless horticultural system in an indoor farming environment accordance with various implementations. The wireless horticultural system includes the climate computer 102 and three adapters 104a, 104b, and 104c. Although three adapters are shown in FIG. 4, the system may include any number of adapters. Each adapter is associated with a different group of controllers, each controller connected to a luminaire. For example, adapter 104a may be associated with controller/luminaire group 402a, adapter 104b may be associated with controller/luminaire group 402b, and adapter 104c may be associated with controller/luminaire 402c. In this example, association may mean that the adapter is configured to communicate with, monitor, and control the controller/luminaire group associated with it. Each adapter 104a, 104b, 104c may each be associated with a large number of controllers, for example in the hundreds. This allows for easily scalable wireless networks in large indoor farming environments.

The controller/luminaire groups may be divided based on various criteria. For example, each controller/luminaire group 402a, 402b, 402c may illuminate different species of plants 404a, 404b, 404c. Different species of plants may require different lighting needs, and so each controller/luminaire group should be controlled independently to provide optimized lighting for each set of plants. In another example, the controller/luminaire groups may be divided based on the spatial restrictions in the indoor farming environment. For example, each controller/luminaire group may be located in a different room in the indoor farming environment, and therefore the luminaires in each room may be controlled as a group but independently of other rooms.

The wireless horticultural system may allow for easy reassociation of adapters to controllers/luminaires to adapt to changes in the indoor farming environment, as well as easy addition or removal of adapters and controllers/luminaires. For example, a grower may change the crops grown in the facility such that plants 404a, 404b are the same plant, and therefore controller/luminaire groups 402a, 402b may be combined. The climate computer 102 may combine controller/luminaire groups 402a, 402b into one group that is controlled by a single adapter (e.g., adapter 104a). In another example, the grower may add additional plant beds for plants 404c, and also add additional luminaires to light the plant beds. The grower may connect controllers to each of the new luminaires and commission them such that they are added to controller/luminaire group 402c that is controlled by adapter 104c. In another example, the grower may change only a portion of plants 404a to be the same species as plant 404c. The climate computer 102 may reassign control of the portion of controller/luminaire group 402*a* that illuminates the changed plants to be controlled by adapter 104*c*. In another example, the grower may add a fourth adapter and split controller/luminaire group 402*c* into two groups, one of which is controlled by controller 104*c* and other by the new adapter.

In some implementations, adapters may be associated with more than one controller/luminaire group for redundancy. For example, adapter 104*b* may be associated with both controller/luminaire groups 404*b*, 404*c*. If adapter 104*c* fails, then adapter 104*b* may assume control of controller/luminaire group 404*c* until adapter 104*c* is repaired or replaced.

In this manner, the adapters and controllers enable a scalable, flexible, reliable, and low cost wireless solution for indoor farming environments. It also enables simple incorporation of a wide range of third-party devices, each of which may utilize different native communication protocols, into the same wireless network. Because the adapters and controllers are configured to convert native communication protocols of the climate computer, luminaires, actuators, and other devices into a single standards-based wireless protocol (e.g., Bluetooth Mesh, Bluetooth Low Energy, Zigbee, Thread, Wi-Fi), every device in the network may easily communicate with every other device in the network. This is especially important in an indoor farming environment, in which there is no one manufacturer that can provide all the equipment used in the facility.

Figure 5:
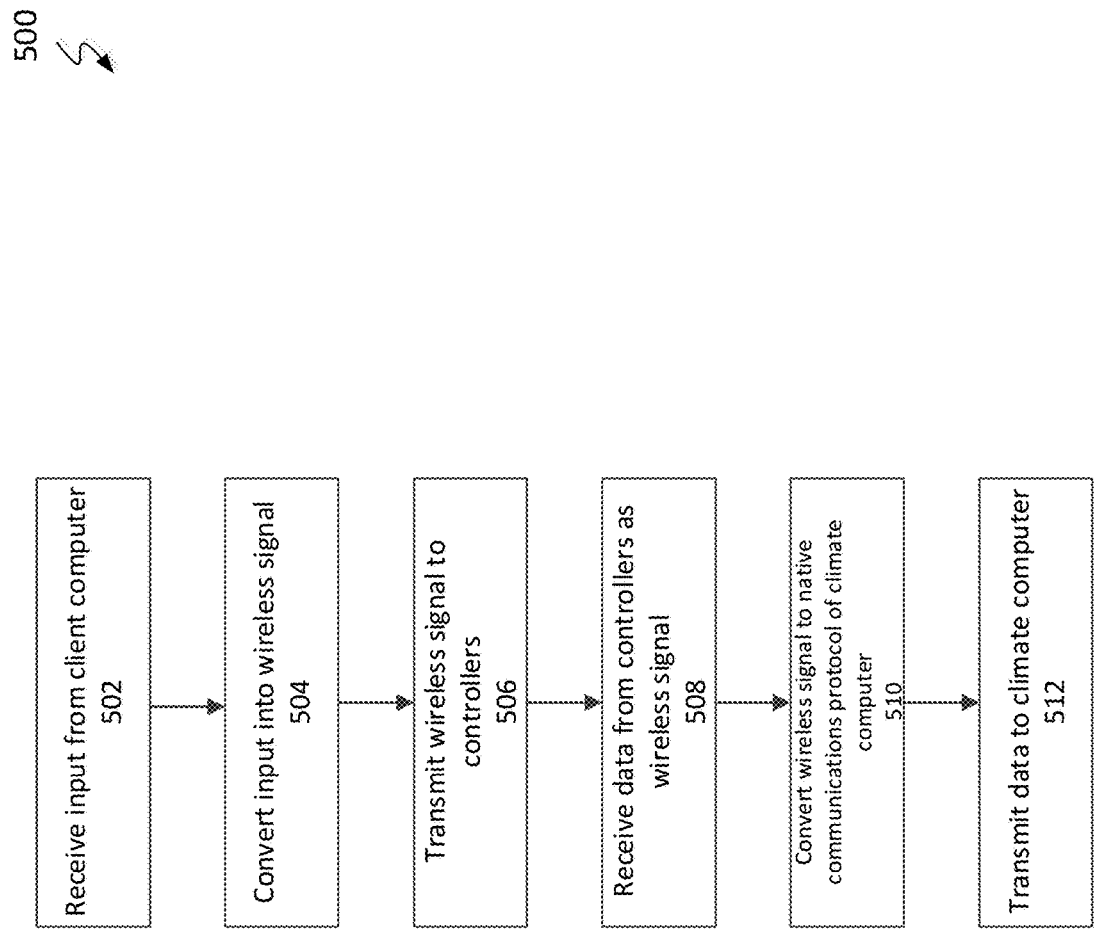
FIG. 5 is method of operating an adapter in a wireless horticultural system in accordance with various implementations.

FIG. 5 is method 500 of operating an adapter in a wireless horticultural system in accordance with various implementations. The method 500 may be performed by an adapter (e.g., adapter 104, 200) in a wireless horticultural system (e.g., wireless horticultural system 100).

In block 502, the adapter may receive an input from a client computer (e.g., client computer 102). The input may be, for example, a command to control a device in the wireless horticultural system. The command may originate from a user, or may be an automated command based on a schedule or machine learning algorithm executing on the client computer. For example, the command may be to adjust the light intensity of one or more luminaires in the wireless horticultural system. In another example, the command may be a lighting schedule for one or more luminaires in the wireless horticultural system. The input may be received in a native communications protocol of the client computer, for example through a 0-10V, PWM, or DALI control interface.

In block 504, the adapter may convert the input into a wireless signal. Specifically, the adapter may take the input, formatted in the native communications protocol of the client computer, and convert it into a standards-based wireless protocol, such as Bluetooth Mesh, Bluetooth Low Energy, Zigbee, Thread, or Wi-Fi.

In block 506, the adapter may transmit the input as a wireless signal to one or more controllers associated with the adapter. The controllers may be connected to various devices, such as luminaires or actuators, that may be controlled by the client computer using the commands received by the adapter.

In block 508, the adapter may wirelessly receive data from one or more of the controllers. The data may be, for example, sensor data, or operational and usage data collected from the devices connected to the controllers (e.g., sensors, luminaires, actuators).

In block 510, the adapter may convert the wireless signal into the native communications protocol of the client computer. For example, the adapter may convert the standards-based wireless protocol (e.g., Bluetooth Mesh, Bluetooth Low Energy, Zigbee, Thread, Wi-Fi) into a specific local interface protocol (e.g., 0-10V, PWM, or DALI control interface).

In block 512, the adapter may transmit the converted data to the client computer. In this manner, the adapter enables seamless wireless communication between a client computer and various end-point devices that may be using different native communications protocols.

Figure 6:
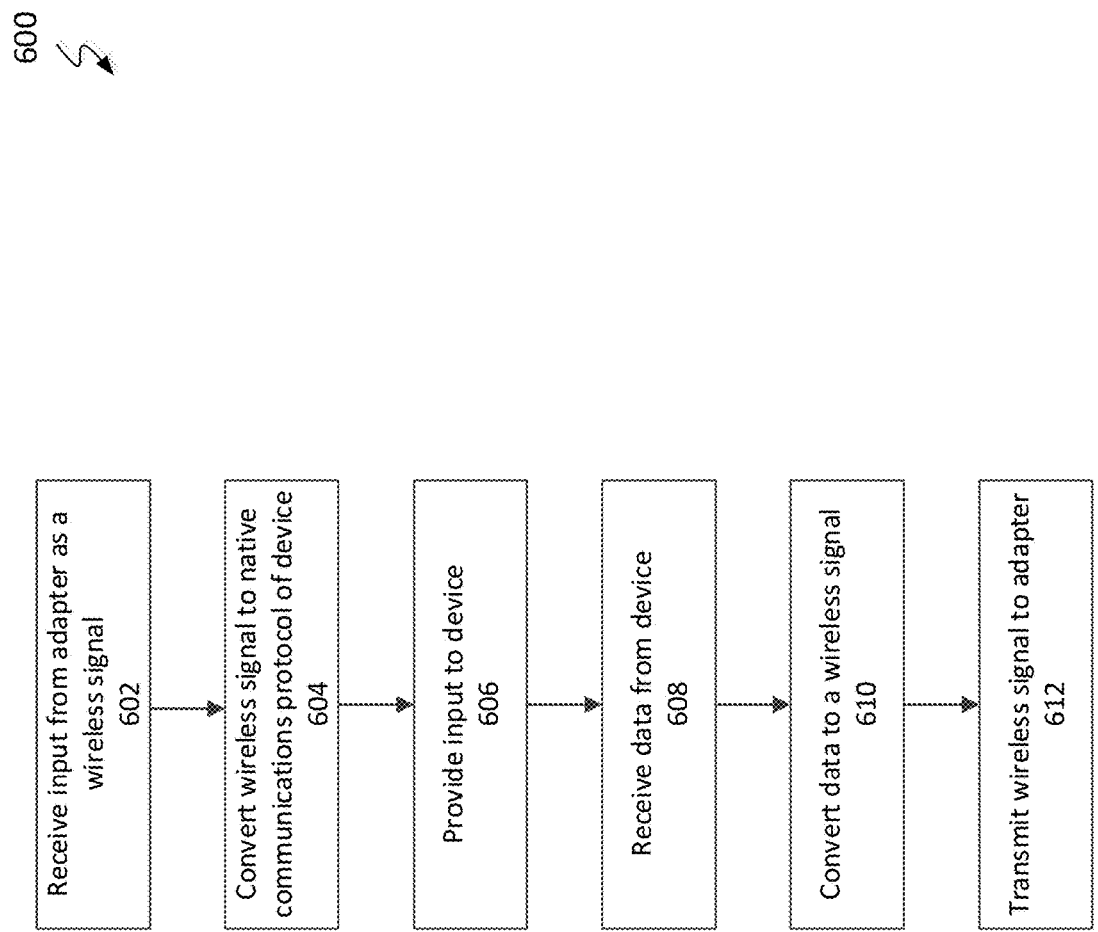
FIG. 6 is method of operating a controller in a wireless horticultural system in accordance with various implementations.

FIG. 6 is method 600 of operating a controller in a wireless horticultural system in accordance with various implementations. The method 600 may be performed by a controller (e.g., controller 106, 300) in a wireless horticultural system (e.g., wireless horticultural system 100).

In block 602, the controller may wirelessly receive an input from an adapter (e.g., adapter 104, 200). The input may be, for example, a command to control a device connected to the controller. For example, the command may be to adjust the light intensity of a luminaire connected to the controller. The command may be received as a standards-based wireless signal, such as Bluetooth Mesh, Bluetooth Low Energy, Zigbee, Thread, or Wi-Fi.

In block 604, the controller may convert the wireless signal into a native communications protocol of the device connected to the controller. For example, the device may be a luminaire and the controller may be configured to convert the wireless signal into a 0-10V control signal for a 0-10V control interface of the luminaire. In some implementations, the device may be configured to natively support the wireless communications protocol and therefore the controller may not need to convert the wireless signal. In this case, block 604 is optional. In block 606, the controller may provide the input to the device via the native communications protocol. If the input is a command, then the device may operate according to the command.

In block 608, the controller may receive data from the device. The data may be, for example, sensor data, or operational and usage data generated by the device. In block 610, the controller may convert the data from the native communications protocol of the device into a wireless signal. For example, the controller may convert a specific local interface protocol (e.g., 0-10V, PWM, or DALI control interface) into a standards-based wireless protocol (e.g., Bluetooth Mesh, Bluetooth Low Energy, Zigbee, Thread, Wi-Fi). In some implementations, the device may be configured to natively support the wireless communications protocol and therefore the controller may not need to convert the data into a wireless signal. In this case, block 6010 is optional.

In block 612, the controller may wirelessly transmit the converted data to the adapter. In this manner, the connector enables seamless wireless communication between a device connected to it and various other nodes and control centers that may be using different native communications protocols.

Figure 7:
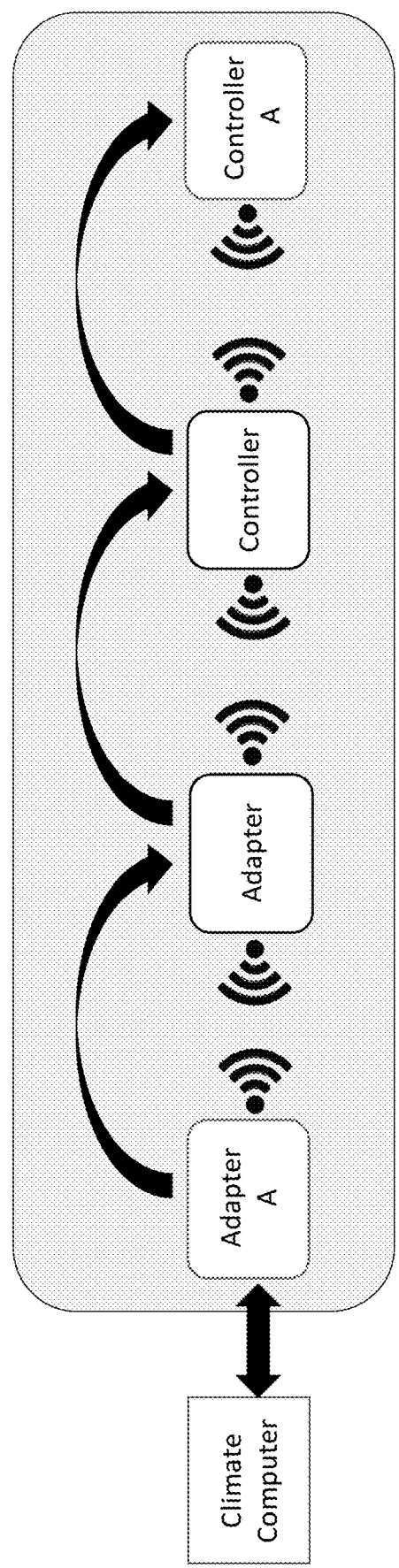
FIG. 7 is a block diagram illustrating the use of an adapter or controller as a repeater in accordance with various implementations.

FIG. 7 is a block diagram illustrating the use of an adapter 200 or controller 300 as a repeater in accordance with various implementations. In the repeater configuration, devices can relay traffic between two nodes in the network which otherwise wouldn't be within radio range of each other (for example, adapter A and controller A in FIG. 7). The adapter or controller acting as a repeater receives the message and rebroadcasts it to devices which are within its radio range. In the example shown in FIG. 7, an intermediary adapter and controller, which are physically located between adapter A and controller A, may receive the signal from adapter A and retransmit to nodes closer to controller A.

Figure 8:
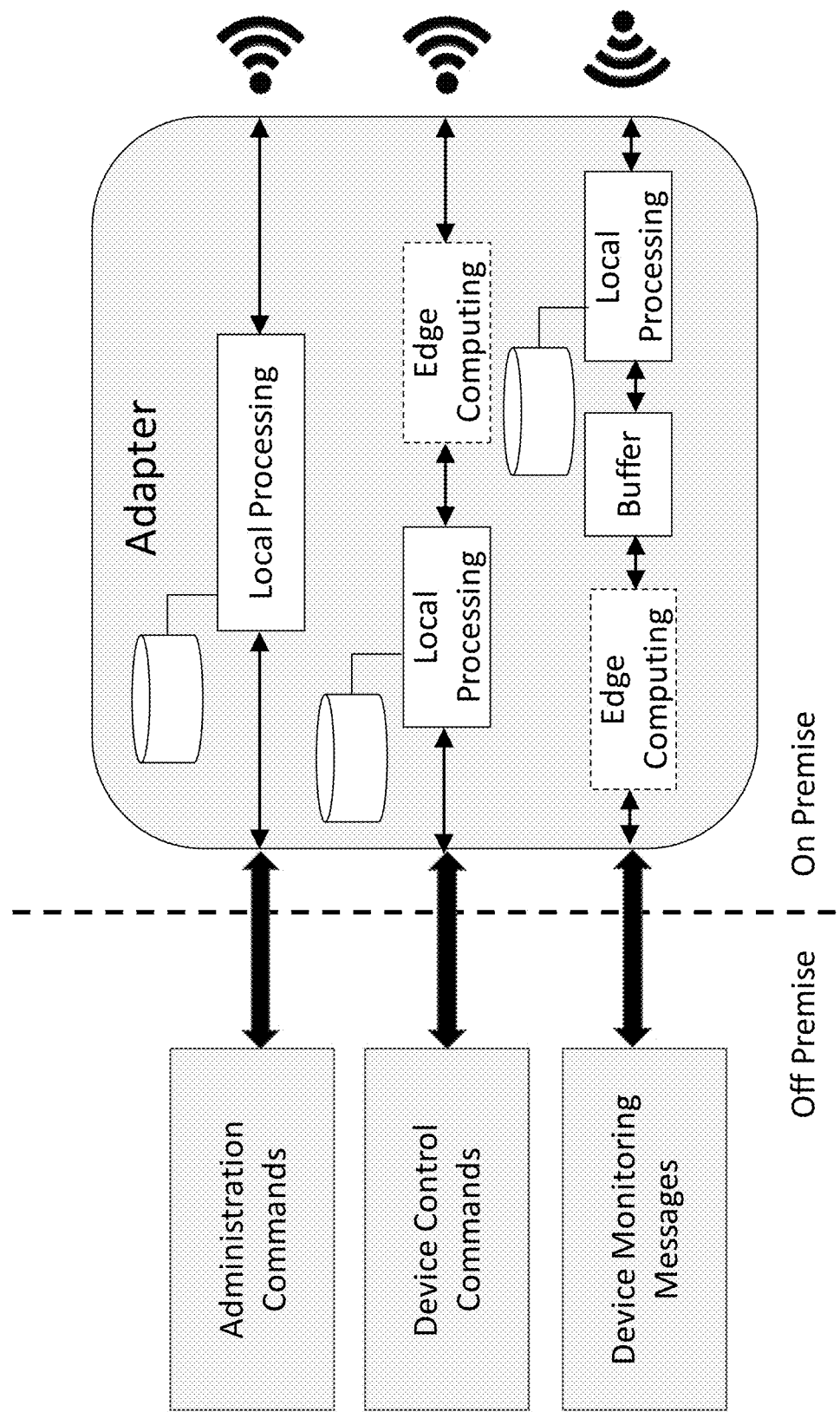
FIG. 8 is a block diagram illustrating the use of an adapter as a remote interface or buffer in accordance with various implementations.

FIG. 8 is a block diagram illustrating the use of an adapter 200 as a remote interface or buffer in accordance with various implementations. The adapter, as remote interface, may accept remote administration commands and device control commands and transmits monitoring messages received from the devices. For device control commands, it may perform local processing before sending the messages out to the network. It may optionally perform edge computing, for example to aggregate individual control messages into a smaller number of messages to reduce local network traffic. In the case of device monitoring messages, it may also store the messages locally. In case the remote connection goes down, the buffered messages may be sent when the connection is restored. Edge computing may optionally be applied to the device monitoring messages, for example to aggregate individual monitoring messages into one message which reports over a large time interval, or to send a message off premise only when a certain (potentially anomalous) condition is detected.

Figure 9:
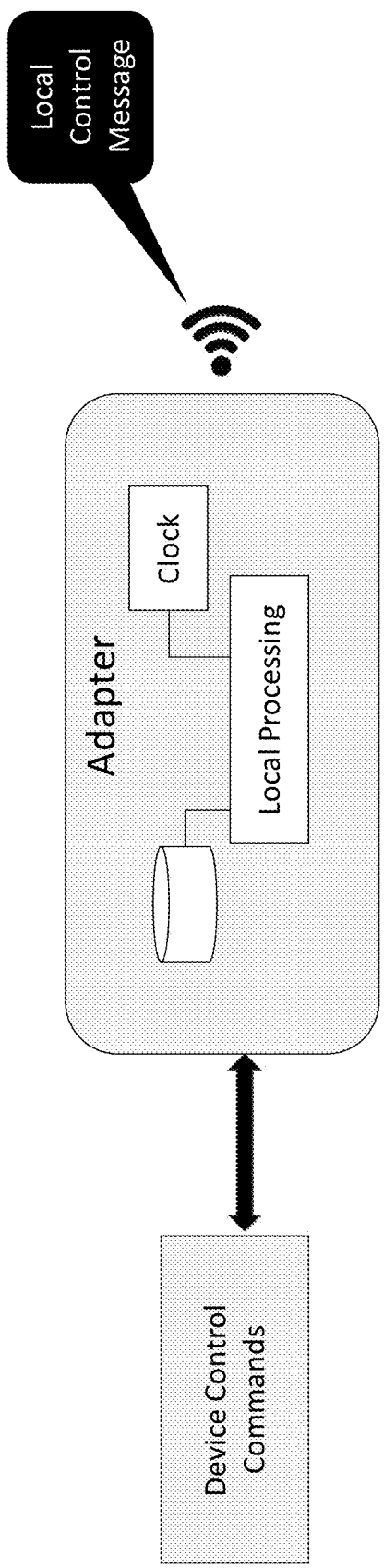
FIG. 9 is a block diagram illustrating the use of an adapter as a scheduler in accordance with various implementations.

FIG. 9 is a block diagram illustrating the use of an adapter 200 as a scheduler in accordance with various implementations. The adapter may receive device control commands from either the local or remote interface and converts the messages into a format which can be stored in the local database. The adapter implements logic via local processing to periodically read the current time (e.g., from an internal clock), compare the schedule entries stored in the database with the current time, and send out a control message to the local network if a change to the state of the devices is required. In case the connection with the local or remote interface is lost, the state of the devices on the local network can continue to change based on the most recent schedule received from the local or remote interface.

Figure 10:
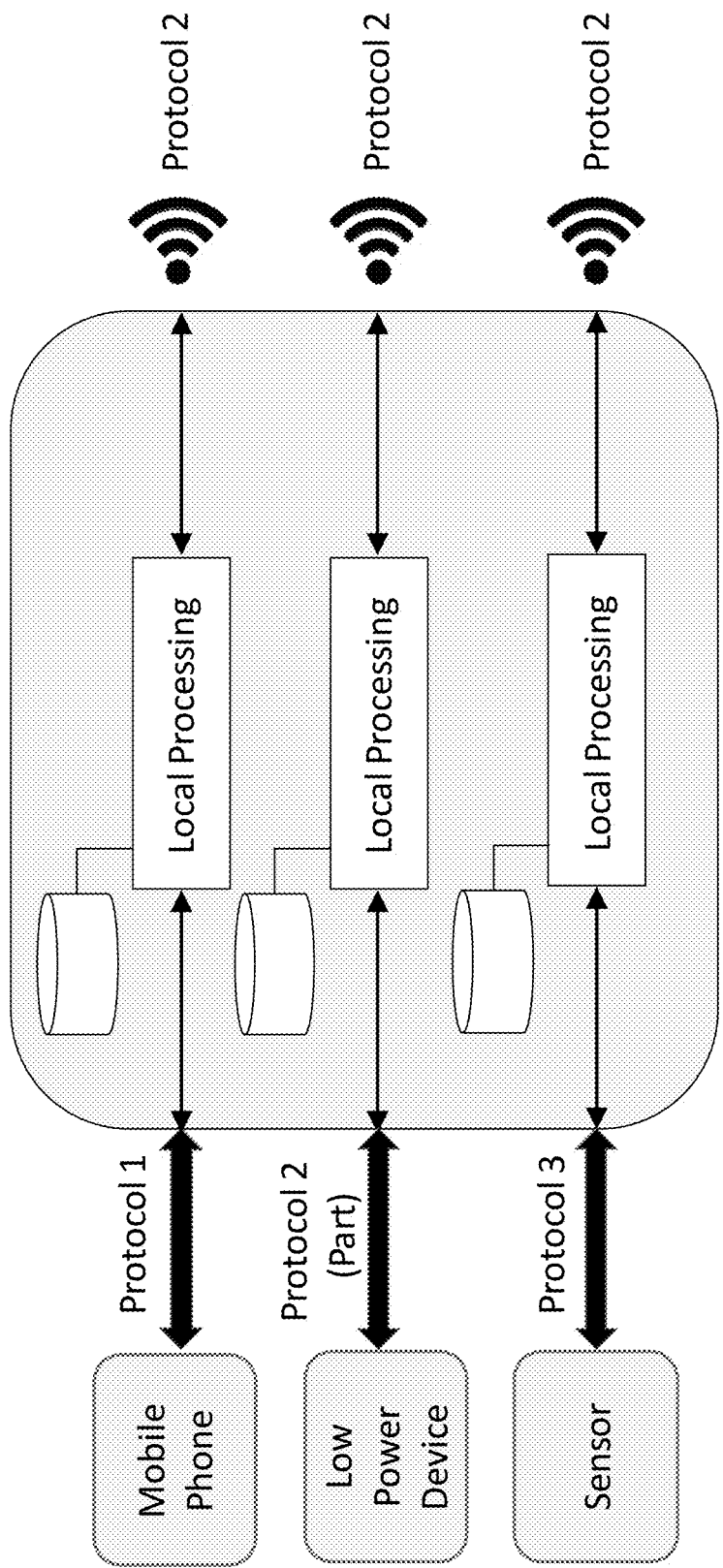
FIG. 10 is a block diagram illustrating the use of an adapter or controller as a network interface bridge in accordance with various implementations.

FIG. 10 is a block diagram illustrating the use of an adapter 200 or controller 300 as a network interface bridge in accordance with various implementations. The adapter or controller, as a network interface bridge, may implement functions such as converting the protocol of a mobile phone into the wireless network protocol, receiving commands from a low power device, such as a battery-less wireless switch, which doesn't have enough power to fully participate in the wireless network protocol, and sending them to the wireless network, or converting the protocol of a sensor into the wireless network protocol.

Figure 11:
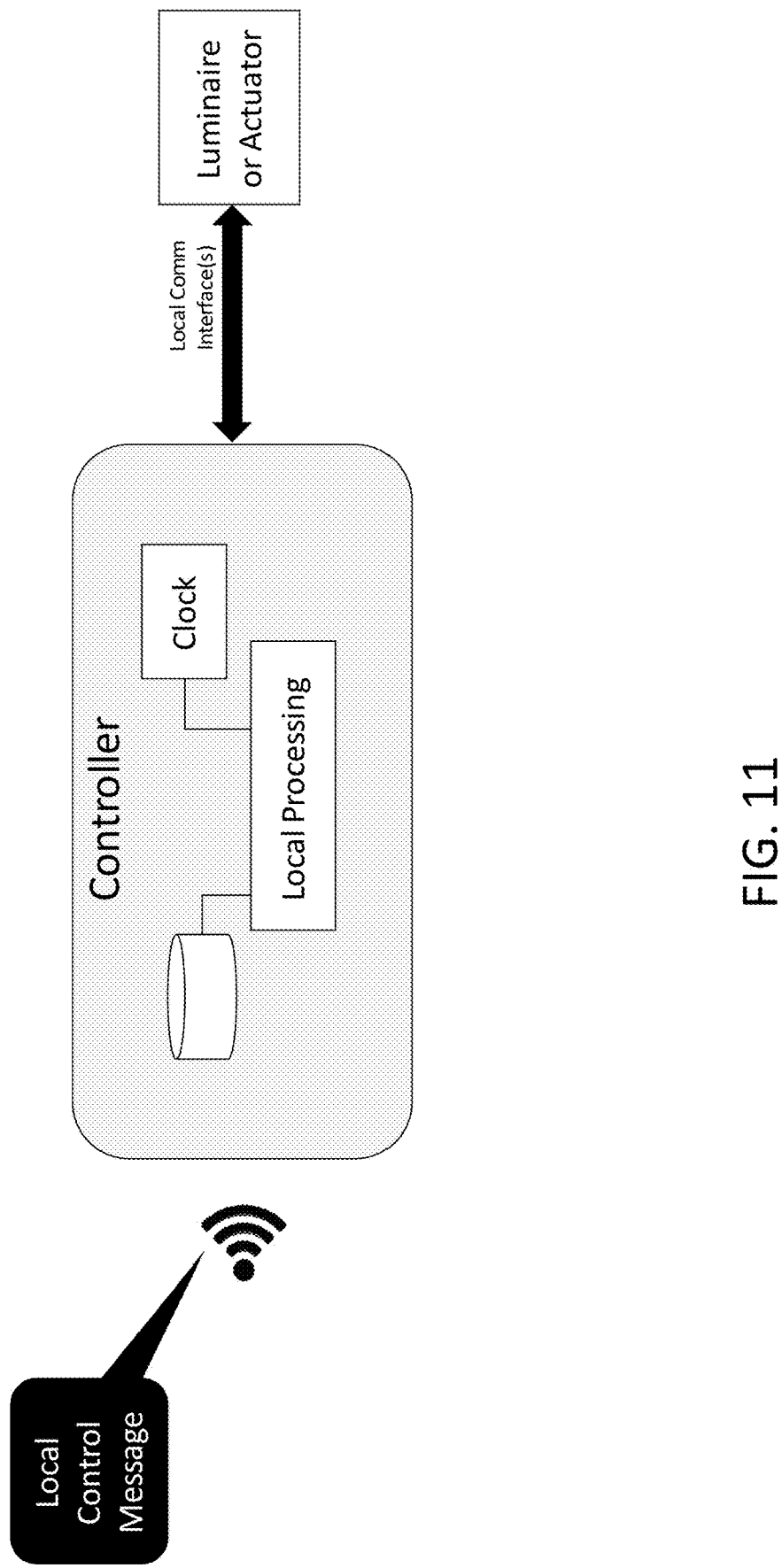
FIG. 11 is a block diagram illustrating the use of a controller as a scheduler in accordance with various implementations.

FIG. 11 is a block diagram illustrating the use of a controller 300 as a scheduler in accordance with various implementations. The controller may receive device control commands from the wireless network and convert the messages into a format which can be stored in the local database. The controller implements logic via local processing to periodically read the current time (e.g., from an internal clock), compare the schedule entries stored in the database with the current time, and send out a control message via the local communication interface if a change to the state of the device is required. In case the connection with the wireless network is lost, the state of the device can continue to change based on the most recent schedule received from the wireless network.

Figure 12:
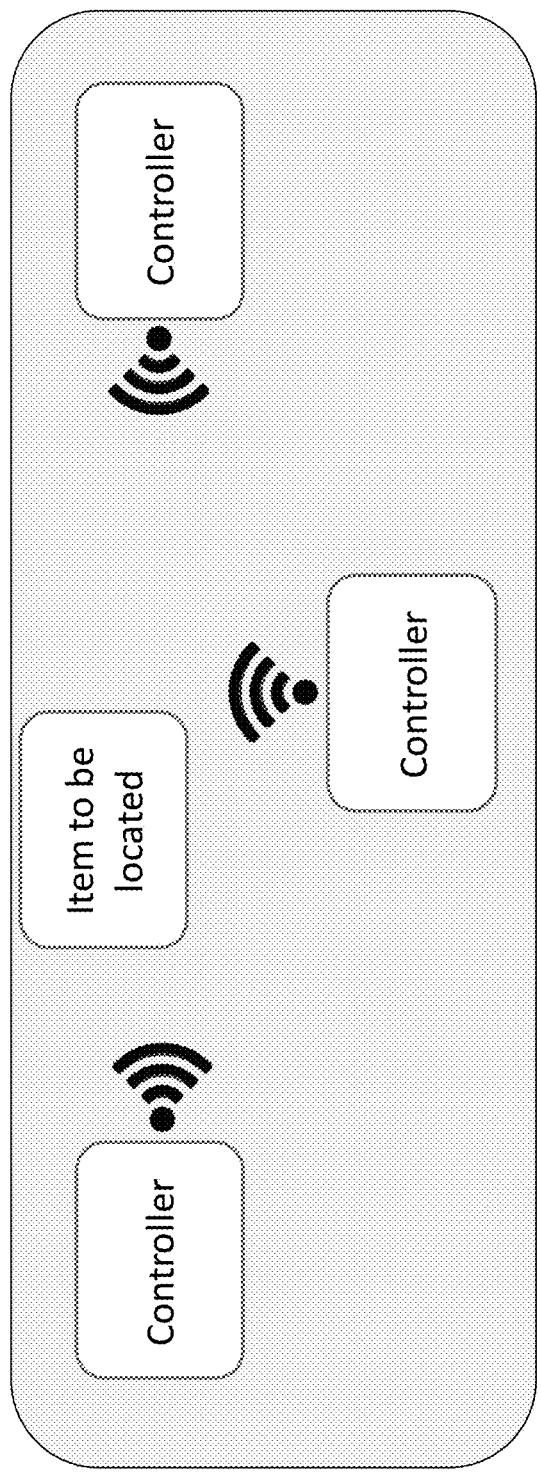
FIG. 12 is a block diagram illustrating the use of a controller as a location beacon in accordance with various implementations.

FIG. 12 is a block diagram illustrating the use of a controller 300 as a location beacon in accordance with various implementations. In addition to sending/receiving standard wireless network traffic, the controllers may also send out periodic beacons to enable location services. An item to be located, for example an asset, may listen to the beacons from several neighboring devices and derive data from several of them (signal strength, time delay, or other RF characteristic). This data may be used by the system to calculate the item's location and report it to users.

Figure 13:
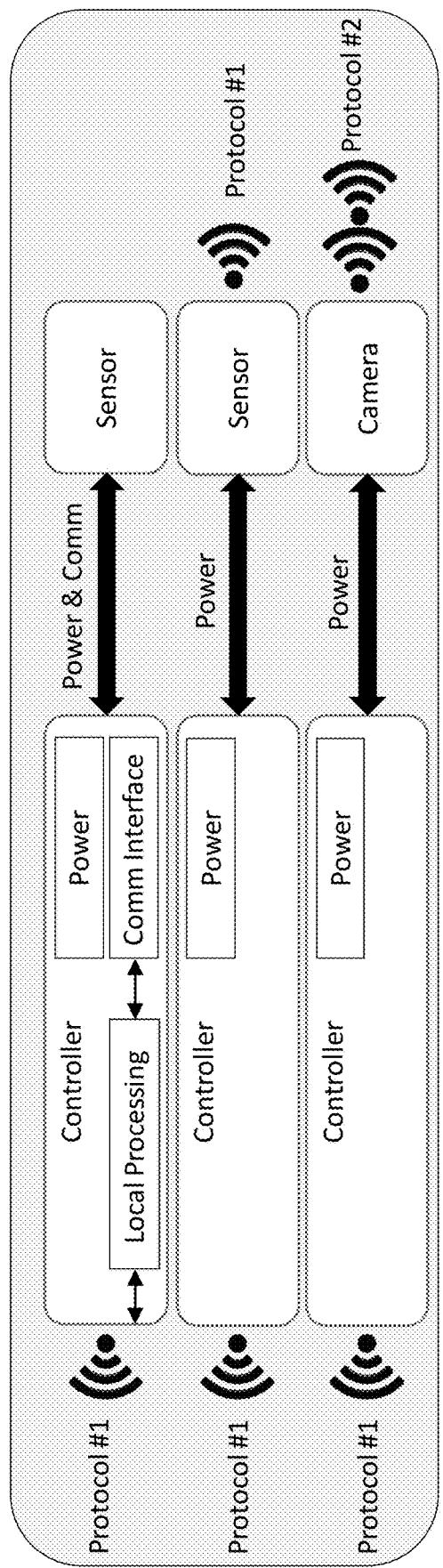
FIG. 13 is a block diagram illustrating the use of a controller as a power and communications interface in accordance with various implementations.

FIG. 13 is a block diagram illustrating the use of a controller 300 as a power and communications interface in accordance with various implementations. In a horticulture environment, the controllers have a unique advantage because they are typically connected to mains-powered devices which are spaced at regular intervals throughout the facility. The controllers may optionally contain a power and/or communication interface which can allow auxiliary devices such as sensors, cameras, etc., to be part of the system, without requiring additional mains power or communication wiring to be pulled. For example, a sensor may use the controller as both a power and communication interface (converting from a different, e.g. wired, protocol), a sensor which natively speaks the wireless protocol may use the controller for power only, or a different device (e.g. camera) which uses a different wireless protocol for communication may use the controller for power only.

Other Considerations

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, Blu-Ray, magnetic disk, internal hard drive, external hard drive, memory stick, flash drive, solid state memory device, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the interne and/or another network. The network(s) may be wired or wireless or a combination thereof and may use one or more communications protocols to facilitate communications between the different processors. The processors may be configured for distributed processing and may utilize, in some implementations, a client-server model as needed. Accordingly, the methods and systems may utilize multiple processors and/or processor devices, and the processor instructions may be divided amongst such single- or multiple-processor/devices.

The device(s), controllers, computers, or computer systems that integrate with the processor(s) may include, for example, a personal computer(s), workstation(s), handheld device(s) such as cellular telephone(s) or smartphone(s) or tablet(s), laptop(s), laptop/tablet hybrid(s), handheld computer(s), smart watch(es), or any another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

The foregoing description of the implementations of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

What is claimed is:

1. A wireless horticultural system, comprising:
a computer;
an adapter configured to:
receive an input from the computer, wherein the input is formatted in a first native communications protocol of the computer;
convert the input from the first native communications protocol into a first wireless signal; and
transmit the first wireless signal to one or more controllers; and
the one or more controllers, wherein a first controller in the one or more controllers is connected to the adapter and configured to:
receive the first wireless signal from the adapter;
provide the input encoded in the first wireless signal to a device connected to the first controller;
receive data from the device, the data comprising at least one of sensor data, operational data of the device, and status data of the device; and
transmit the data encoded in a second wireless signal to at least one of (i) the adapter or (ii) one or more other controllers
wherein at least one of (i) the adapter is further configured to store schedules for controlling devices connected to the one or more controllers, and the adapter further comprises a first onboard clock and is further configured to generate wireless signals comprising control commands at scheduled times based on the stored schedules and the first onboard clock, and (ii) the first controller is further configured to store schedules for controlling the device connected to the first controller, and the first controller further comprises a second onboard clock and is further configured to generate inputs comprising control commands to provide to the device at scheduled times based on the stored schedules and the second onboard clock.

2. The wireless horticultural system of claim 1, wherein the controller is configured to provide the input encoded in the first wireless signal to the device by:
converting the first wireless signal into a second native communications protocol of the device; and
providing the converted first wireless signal to the device.

3. The wireless horticultural system of claim 2, wherein the first native communications protocol and the second native communications protocol are the same.

4. The wireless horticultural system of claim 1, wherein the data is formatted in a second native communications protocol and the first controller is further configured to convert the data into the second wireless signal.

5. The wireless horticultural system of claim 4, wherein the first native communications protocol and the second native communications protocol are the same.

6. The wireless horticultural system of claim 1, wherein the first controller transmits the second wireless signal to the adapter and the adapter is further configured to:
receive the second wireless signal;
convert the second wireless signal into the first native communications protocol; and
transmit the converted second wireless signal to the computer.

7. The wireless horticultural system of claim 1, wherein the first wireless signal and the second wireless signal use a same wireless protocol.

8. The wireless horticultural system of claim 1, wherein the first controller is further configured to buffer the received data from the device.

9. The wireless horticultural system of claim 8, wherein the first controller is further configured to perform data processing on the buffered data and transmit the processed data to at least one of (i) the adapter and (ii) the one or more controllers.

10. The wireless horticultural system of claim 1, wherein the first communications protocol is one of a 0-10V, PWM, or DALI control interface.

11. The wireless horticultural system of claim 1, wherein the first wireless signal is a Bluetooth Mesh signal.

12. The wireless horticultural system of claim 1, wherein the input comprises a command to control the device.

13. The wireless horticultural system of claim 1, wherein the device comprises a luminaire illuminating one or more plants.

14. The wireless horticultural system of claim 13, wherein the input comprises a command to change a light intensity of the luminaire.

15. The wireless horticultural system of claim 1, wherein at least one of:
the adapter is further configured to relay wireless signals from the first controller to a second controller or a second adapter in the wireless horticultural system; and
the first controller is further configured to relay wireless signals from at least one of the adapter or the second controller to a third controller or the second adapter.

16. The wireless horticultural system of claim 1, wherein the adapter is further configured to act as an interface with one or more devices that are remote from the wireless horticultural system.

17. The wireless horticultural system of claim 1, wherein the adapter is further configured to buffer data for devices or sensors connected to the one or more controllers.

18. The wireless horticultural system of claim 17, wherein the adapter is further configured to perform data processing on the buffered data and transmit the processed data to the computer.

19. The wireless horticultural system of claim 1, wherein at least one of (i) the adapter and (ii) the first controller is further configured to convert a third native communications protocol of an external device into a wireless protocol used by the wireless horticultural system.

20. The wireless horticultural system of claim 1, wherein the first controller is further configured to act as a beacon for providing location services.

21. The wireless horticultural system of claim 1, wherein the first controller is further configured to provide power to auxiliary components connected to the first controller and/or to communicate with the auxiliary components using a fourth native communications protocol.

22. A method of operating a wireless horticultural system, comprising:
receiving, at an adapter, an input from a computer, wherein the input is formatted in a first native communications protocol of the computer;
converting, by the adapter, the input from the first native communications protocol into a first wireless signal;
storing, by the adapter, schedules for controlling devices connected to one or more controllers;
generating, by the adapter, wireless signals comprising control commands at scheduled times based on the stored schedules and a first onboard clock on the adapter;
transmitting, by the adapter, the first wireless signal to the one or more controllers;
receiving, at a first controller in the one or more controllers, the first wireless signal from the adapter;
providing, by the first controller, the input encoded in the first wireless signal to a device connected to the first controller;
storing, by the first controller, schedules for controlling the device connected to the first controller;
generating, by the first controller, inputs comprising control commands to provide to the device at scheduled times based on the stored schedules and a second onboard clock on the first controller;
receiving, at the first controller, data from the device, the data being formatted in a second native communications protocol; and
converting, by the first controller, the data into a second wireless signal; and
transmitting the data encoded in the second wireless signal to at least one of (i) the adapter or (ii) one or more other controllers.

23. The method of claim 22, wherein providing the input encoded in the first wireless signal to the device comprises:
converting the first wireless signal into a second native communications protocol of the device; and
providing the converted first wireless signal to the device.

24. The method of claim 22, further comprising:
transmitting, by the first controller, the second wireless signal to the adapter;
receiving, at the adapter, the second wireless signal;
converting, by the adapter, the second wireless signal into the first native communications protocol; and
transmitting the converted second wireless signal to the computer.

* * * * *